Jan. 26, 1960
W. R. DANIELSON ET AL
2,922,284
CONSTANT TEMPERATURE APPARATUS
Filed March 10, 1958
3 Sheets-Sheet 1
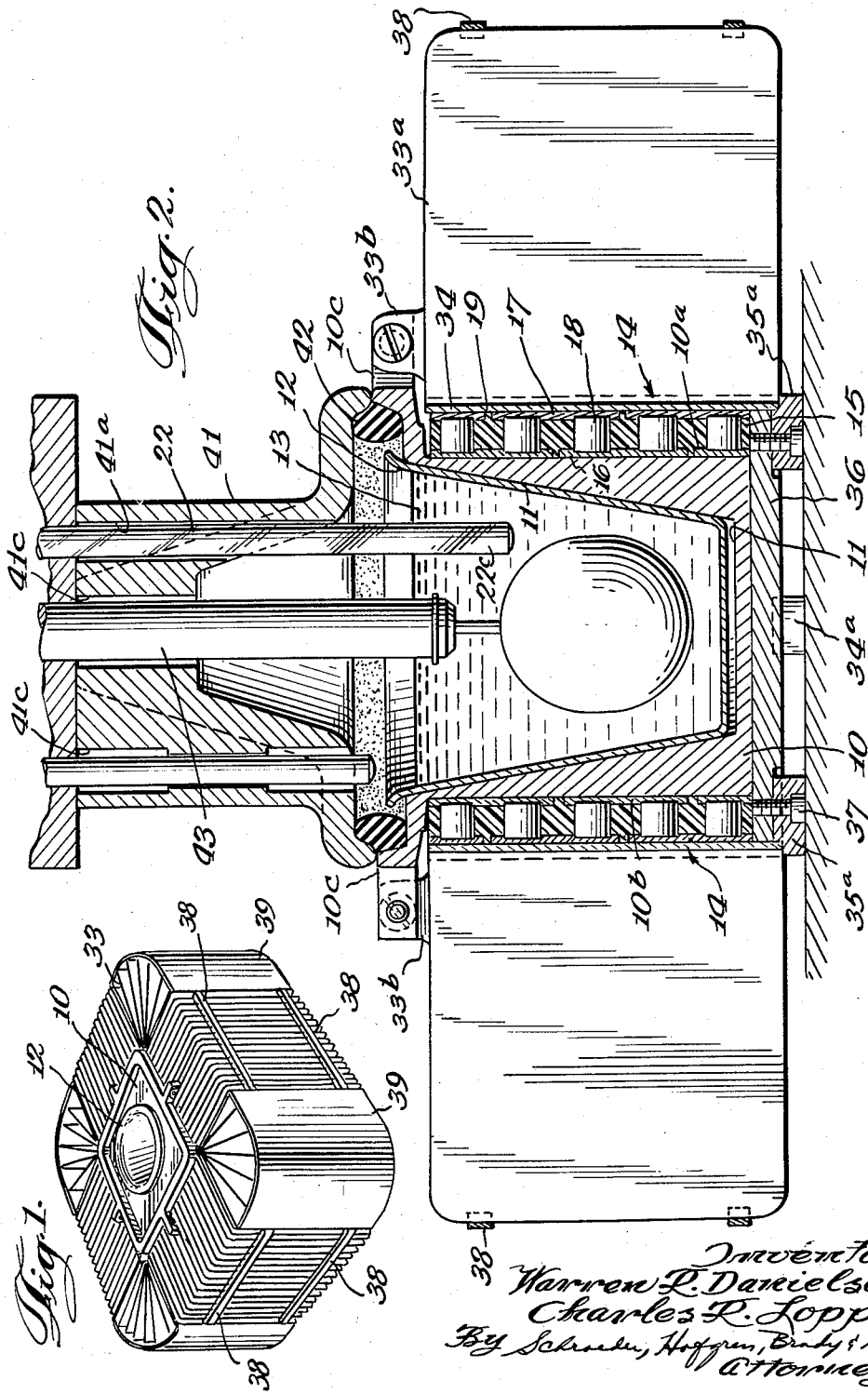
Inventors
Warren R. Danielson
Charles R. Lopp
By Schroeder, Hofgren, Brady & Wegner
Attorneys Jan. 26, 1960 W. R. DANIELSON ET AL 2,922,284
CONSTANT TEMPERATURE APPARATUS
Filed March 10, 1958 3 Sheets-Sheet 2
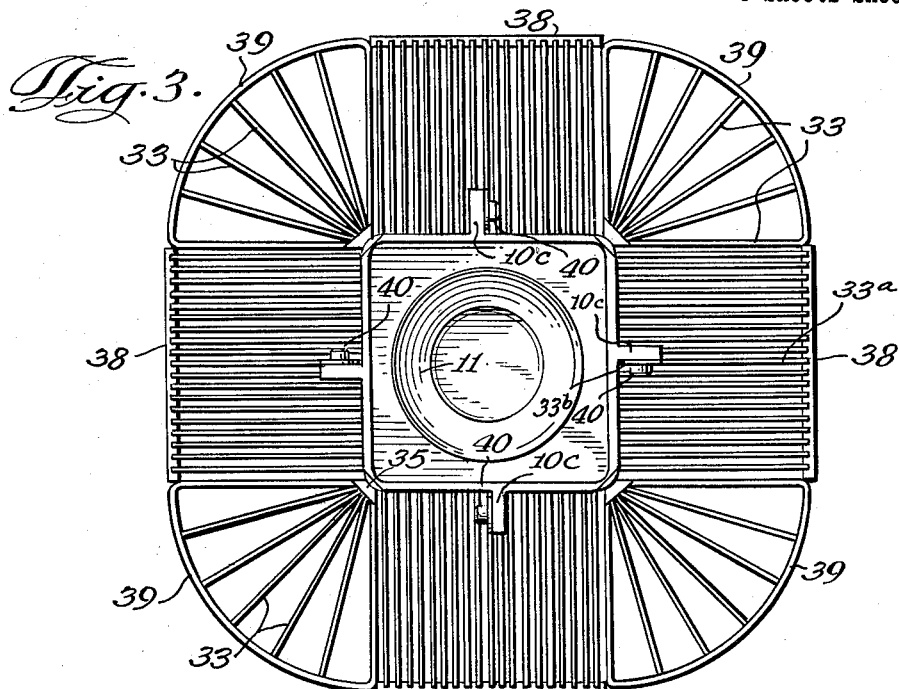
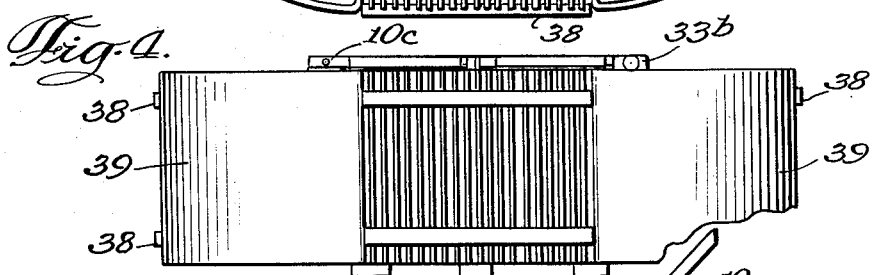
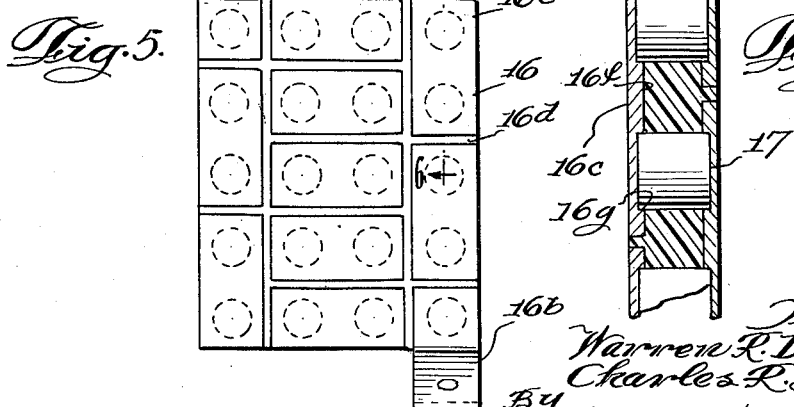
Inventors
Warren R. Danielson
Charles R. Lopp
By Schroeder, Hofgren, Brady & Wegner
Attorneys

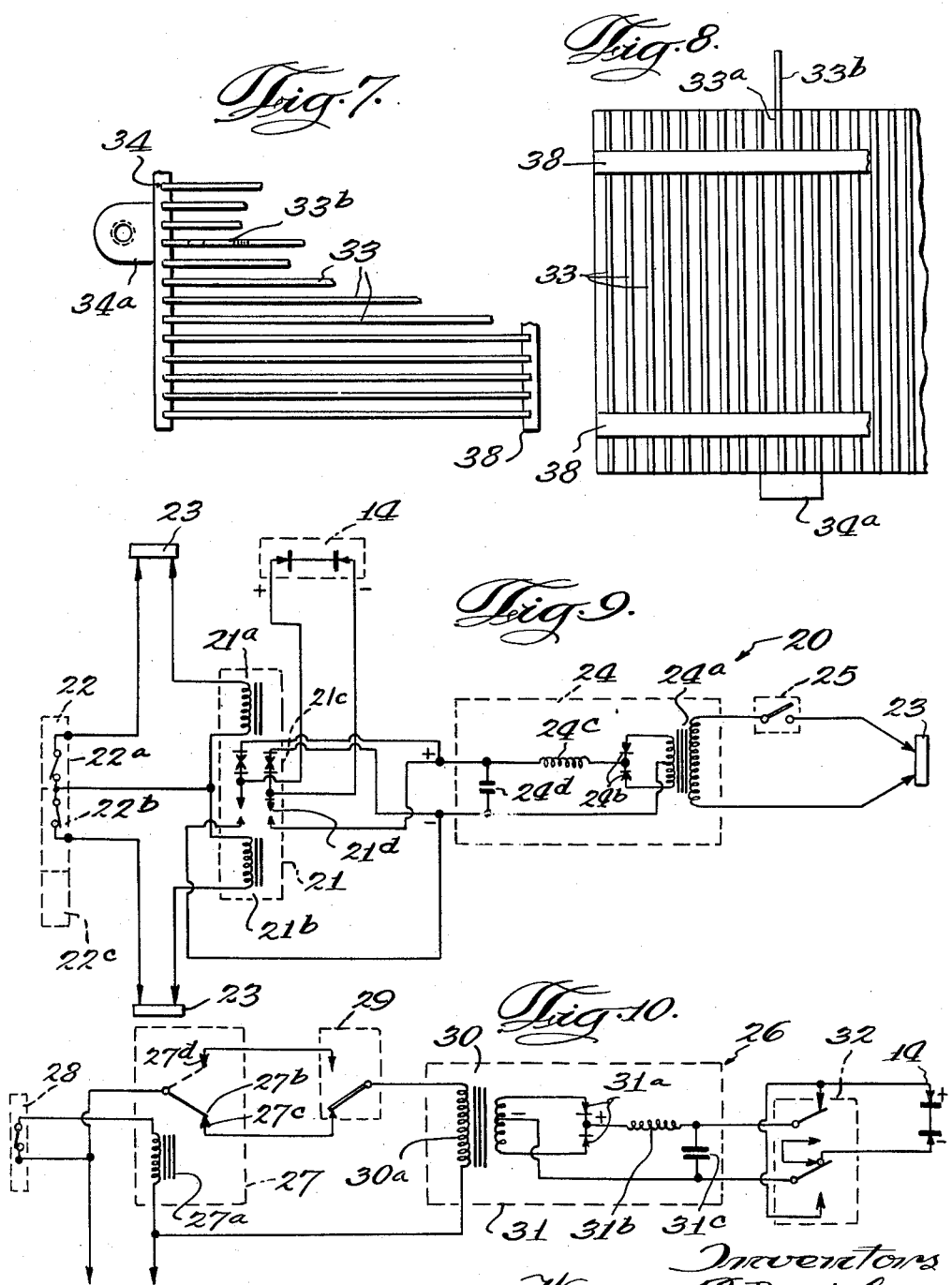

United States Patent Office 2,922,284
Patented Jan. 26, 1960

2,922,284

CONSTANT TEMPERATURE APPARATUS

Warren R. Danielson and Charles R. Lopp, Benton Harbor, Mich., assignors to Whirlpool Corporation, a corporation of Delaware Application March 10, 1958, Serial No. 720,308

5 Claims. (Cl. 62—3)

This invention relates to a temperature regulating apparatus and in particular to a means for heating or cooling a liquid to a predetermined temperature and maintaining the liquid substantially at that temperature.

The heating or cooling of a small quantity of liquid to a predetermined temperature and the subsequent accurate maintaining of the liquid at that temperature has been a problem not fully satisfactorily answered by the known devices. Certain of the known devices are relatively large in size, making their use cumbersome. In certain known devices, the means for effecting the temperature regulation have not satisfactorily accurately maintained the liquid temperature at the desired temperature. Further, heretofore, relatively complicated control means have been utilized for regulating the thermal elements of the devices.

The instant invention comprehends a new and improved means for bringing a liquid to a predetermined temperature and accurately maintaining the liquid at that temperature, which means is compact, simple and accurate.

Another feature of the invention is that it comprehends a new and improved device utilizing the Peltier effect to attain the desired temperature regulation.

A further feature is the provision of such a device adapted for use in a means for determining physical properties of a liquid sample.

Other features and advantages of this invention will be apparent from the following description taken in connection with the accompanying drawings wherein:

Fig. 1 is a perspective view of a temperature regulating device embodying the invention;

Fig. 2 is a vertical section thereof with a cover extending over the recess, a measuring device extending through the cover into the recess being shown fragmentarily;

Fig. 3 is a top plan view of the device;

Fig. 4 is a front elevation thereof;

Fig. 5 is a front elevation of a thermoelectric means assembly;

Fig. 6 is a vertical section taken approximately along the line 6—6 of Fig. 5;

Fig. 7 is a fragmentary top plan view of the heat transferring fin structure;

Fig. 8 is a fragmentary end elevation thereof;

Fig. 9 is a schematic diagram of electrical circuit means for controlling the thermoelectric elements; and Fig. 10 is a schematic diagram of another form of circuit means for controlling the thermoelectric elements.

In the exemplary embodiment of the invention as disclosed in the drawings, a means for bringing a liquid to a predetermined temperature and accurately maintaining the liquid at that temperature is shown to comprise a cup-shaped body 10 provided with an outwardly opening recess 11 adapted to receive removably a complementary thin-walled receptacle or cup 12. Each of body 10 and cup 12 is preferably formed of a material having a high thermal conductivity, such as aluminum. Recess 11 and cup 12 are similarly frusto-conically tapered whereby the cup has intimate surface engagement with the body and the recess before the cup is fully received therein to assure good heat transferring characteristics between the body and the cup.

To regulate the temperature of a body of liquid 13 in cup 12, a thermoelectric means 14 is arranged in encircling association with the body. The lateral outer side wall of body 10 is defined by four planar surfaces, such as surfaces 10a and 10b, as seen in Fig. 2 whereby the outer cross section of the body is square, as best seen in Fig. 3. Thermoelectric means 14 comprises four similar panels one each in heat transferring relationship with a corresponding wall surface. As each of the panels is similar, the following description of one assembly, namely panel 15 confronting surface 10a of the body, will suffice for all.

Thermoelectric panel 15 comprises a plurality of dissimilar couples utilizing the Peltier effect to effect a heating or cooling in accordance with the polarity of a direct current flowing therethrough. As best seen in Figs. 2, 5 and 6, the panel comprises a dissipator plate assembly 16 having a pair of terminals 16a and 16b at the diagonally opposite corners thereof. Plate assembly 16 comprises a plurality of individual, electrically conductive plates 16c insulatingly spaced from one another. The inner face 16d of each plate 16c is provided with a pair of cylindrical recesses 16e, except the plates forming terminals 16a and 16b in which a single recess is provided. An absorber plate assembly 17, which is generally similar to dissipator plate assembly 16 except that no terminals are provided thereon, is arranged in facially spaced relationship to dissipator plate assembly 16 and a plurality of cylindrical thermoelectric elements 18 extend between the plates with the ends of the elements being received in the confronting aligned recesses of the plates to be in series electrical relationship between terminals 16a and 16b. The remaining space between the plates is filled with an insulating material 19 such as a foamed-in-place, rigid type polystyrene plastic. A thermoelectric means, such as described above, is more fully disclosed in the co-pending Mervin K. Baer, Jr. and Charles R. Lopp application Serial No. 735,804, filed May 16, 1958 and assigned to the same assignee, to which application reference may be had for further details of the structure thereof.

Thermoelectric means 15 functions so that when direct current flows in one direction between terminals 16a and 16b, plate assembly 16 becomes a hot junction wherein heat is produced and conducted through body 10 and cup 12 to the liquid 13 in the cup. A reverse current flow between terminals 16a and 16b causes plate assembly 16 to become the cold junction and, thus, heat is withdrawn through body 10 and cup 12 from the liquid in the cup. In Fig. 9, a circuit arrangement 20 for automatically effecting the alternative current flow through the thermoelectric means 14 is shown to comprise a double pole, double throw relay 21 having a first coil 21a connected in series with a first portion 22a of a suitable themo-regulator 22 to a suitable power supply 23. Thermo-regulator portion 22a comprises a switch means which closes whenever the temperature of the liquid 13 in cup 12 is greater than a predetermined value as determined by a sensing portion 22c of the thermo-regulator which is disposed within the liquid within the cup. A second coil 21b of relay 21 is connected in series with a second portion 22b of the thermo-regulator to power supply 23. Second portion 22b comprises a switch means which is arranged to open when the temperature of the liquid 13 decreases to below a predetermined temperature. A first set of contacts 21c is provided on relay 21 which closes when coil 21a is energized, thereby connecting the thermoelectric means 14 to a direct current power supply 24. Power supply 24 includes a center-tapped transformer 24a, suitable rectifier elements 24b and a filter including an inductive coil 24c and a capacitor 24d. A manually operable switch 25 controls the connection of power supply 24 to the alternating current power supply 23.

A second set of contacts 21d of relay 21 are electrically associated with direct current power supply 24 and thermoelectric means 14 to cause when coil 21b is de-energized to close contacts 21d, a current flow through the thermoelectric means in the opposite direction to that caused by contacts 21c. Contacts 21c and 21d are mechanically interlocked so that only one set of contacts may be closed at a time.

Thus, depending on which switch means portion of thermo-regulator 22 is closed, energy is delivered to the thermoelectric means 14 so that dissipator plate assembly 16 is selectively a hot junction or a cold junction causing a heat transfer between the liquid 13 in cup 12 and the thermoelectric means maintaining the temperature of the liquid 13 accurately at the predetermined temperature.

In Fig. 10 is shown a modified form of electrical circuit 26 for controlling the energization of thermoelectric means 14. In circuit 26, a single pole, double throw relay 27 is provided with a coil 27a in series electrical relationship with a thermo-regulator 28 which is generally similar to thermo-regulator 22 except that the regulator comprises one portion only, which portion is arranged to close when the temperature is above a predetermined temperature. Relay 27 is provided with a movable contact 27b which closes with a first stationary contact 27c when relay coil 27a is energized and with a second stationary contact 27d when relay coil 27a is not energized. Contacts 27c and 27d are connected through a manually operable, single pole, double throw switch 29 to the primary 30a of a transformer 30 in a direct current power supply 31. Power supply 31 further includes suitable rectifiers 31a and filter means including an inductive coil 31b and a capacitor 31c to provide the direct current to thermoelectric means 14 through a suitable manually operable, double pole, double throw switch 32. Switch 32 is connected between the power supply and thermoelectric means 14 so that in its alternatively thrown positions it effects alternatively opposite current flows through the thermoelectric means.

In operating thermoelectric means 14 with the circuit arrangement 26, the operator first determines whether the desired temperature of liquid 13 is higher or lower than the ambient temperature. If the desired temperature is lower than the ambient temperature, it is obvious that only a cooling effect need be produced by thermoelectric means 14 on the liquid and switches 29 and 32 are thrown so as to operate circuit 26 to obtain only a cooling effect on the liquid. Thus, as seen in Fig. 10, switch 29 is thrown so that when thermo-regulator 28 energizes relay coil 27a (whenever the temperature of liquid 13 is higher than the predetermined temperature), current may pass from contact 27c to the transformer primary 30a. Switch 32 is concurrently thrown to the position wherein the energization of the thermoelectric means 14 by direct current power supply 31 causes plate assembly 16 of the thermoelectric means to be the cold junction. Thus, whenever the temperature of the liquid rises above a predetermined temperature, thermoelectric means 14 is energized to have a cooling effect on liquid 13.

Alternatively, if the operator determines that the ambient temperature is below that of the predetermined temperature at which it is desired to maintain liquid 13, switches 29 and 32 are reversely thrown so that switch 29 energizes primary 30a of the transformer 30 whenever thermo-regulator 28 is open and coil 27a of relay 27 is not energized. Under these conditions, primary 30a of the transformer is energized through switch 29 from contact 27d, movable contact 27b then being in contact therewith as shown in dotted lines in Fig. 10. Switch 32 is concurrently reversely arranged so that the current flow from direct current power supply 31 is in the reverse direction, making plate assembly 16 the hot junction and, thereby, providing heat to the liquid 13 in cup 12 to raise the temperature thereof to the predetermined temperature.

To improve the efficiency of the device and to minimize effectively the over-all size thereof and the necessary energy capacity of the thermoelectric means, means are provided for effecting improved heat transfer between the surrounding atmosphere and the thermoelectric means 14. The heat transferring means comprises a plurality of fins 33 extending outwardly from the thermoelectric means in planes generally parallel to the axis of recess 11. The fins are secured to a plurality of heat transfer plates 34 facially juxtaposed to and generally congruent with absorber plate assemblies 17 of the thermoelectric means 14, and to corner plates 35 disposed between each of adjacent, right angularly related pairs of transfer plates 34. Plates 34 and 35 are secured in encircling relationship with the thermoelectric means 14 by means of a baseplate 36 extending under body 10 to which are connected co-operating feet on the plates, such as feet 34a on transfer plates 34 and feet 35a on corner plates 35. The feet are secured to the underside of baseplate 36 by suitable connecting means, such as screws 37, to urge the plates into improved heat transferring relationship with the thermoelectric means 14.

Reinforcing spacer bars 38 and curved baffle plates 39 are provided to maintain the outer ends of fins 33 in spaced relationship to each other, permitting ready air flow over the fins whereby heat transfer between the fins and the atmosphere is readily effected. Each of fins 33, plates 34 and 35, spacer bars 38 and baffle plates 39 may be formed of a material having a high coefficient of thermal conductivity, such as aluminum, thereby effectively maximizing the heat transferring characteristics thereof.

To secure the fin assemblies more positively in place around thermoelectric means 14, a centrally disposed fin 33a is provided with an upstanding ear 33b and body 10 is provided with an outwardly extending, complementary ear 10c arranged to extend to a point laterally of ear 33b. Screws 40 extend through ears 33b into ears 10c to secure the ears firmly together and, thereby, provide a firm upper support for the fin assemblies.

To improve further the temperature regulating functioning of the device, a closure 41 may be extended across the upper end of recess 11 and sealed to body 10 by means of a suitable annular sealing ring 42. Suitable passages, such as passages 41a, 41b, and 41c may be provided through closure 41 to permit the introduction into cup 12 of means such as thermo-regulator 22, density measuring means 43, etc., as desired.

Because of the substantially vertically unobstructed arrangement of the fins, natural convection of the atmospheric air provides an improved heat transfer. If desired, however, a forced draft may be effected by laterally shrouding the device and moving the air through the spaces between the fins by suitable powered fan means.

Having described our invention as related to the embodiment shown in the accompanying drawings, it is our intention that the invention be not limited by any of the details of description, unless otherwise specified, but rather be construed broadly within its spirit and scope as set out in the accompanying claims.

We claim:

1. Means for bringing a liquid to a predetermined temperature and maintaining the liquid constantly at that temperature, comprising: a body formed of a material having a high coefficient of thermal conductivity and provided with an outwardly opening recess; Peltier effect thermoelectric means having one junction arranged in heat conductive association with the body; heat transferring means extending outwardly from the opposite junction of the thermoelectric means for conducting heat between the thermoelectric means and the surrounding atmosphere; and means responsive to the temperature of a liquid in the recess controlling the energization of the thermoelectric means to make said one junction alternatively the hot and cold junction so as to bring the liquid to and maintain the liquid at a predetermined temperature.

2. The device of claim 1 wherein the means controlling the energization of the thermoelectric means includes means automatically alternatively making said one junction the cold junction when the temperature of the liquid is above the predetermined temperature and making said one junction the hot junction when the temperature of the liquid is below the predetermined temperature.

3. The device of claim 1 wherein the means controlling the energization of the thermoelectric means includes a manually operable switch selectively making said one junction the hot junction or the cold junction and means alternatively energizing the thermoelectric means only when the temperature of the liquid is below the predetermined temperature while the switch is arranged to make said one junction the hot junction and energizing the thermoelectric means only when the temperature of the liquid is above the predetermined temperature while the switch is arranged to make said one junction the cold junction.

4. In a device for performing operations on a small liquid sample, means for bringing a liquid to a predetermined temperature and maintaining the liquid constantly at that temperature, comprising: a thin walled body formed of a material having a high coefficient of thermal conductivity and provided with an outwardly opening recess; thin, Peltier effect thermoelectric panel structures arranged in facial heat conductive association with the body; heat transferring means extending outwardly from the thermoelectric means for conducting heat between the thermoelectric means and the surrounding atmosphere; a receptacle removably received in said recess in intimate heat conductive engagement with the body; and means responsive to the temperature of a liquid sample in the receptacle effecting energization of the thermoelectric means alternatively to heat and cool said body, thereby to maintain the sample at a predetermined temperature.

5. The device of claim 1 wherein the means controlling the energization of the thermoelectric means includes first switch means arranged to close whenever the temperature of the liquid is greater than a predetermined temperature; second switch means arranged to open whenever the temperature of the liquid is less than the predetermined temperature; and relay means controlled by said switch means to control energization of said thermoelectric means.

References Cited in the file of this patent

UNITED STATES PATENTS

| | | |
|---|---|---|
| 413,136 | Dewey | Oct. 19, 1889 |
| 2,232,998 | Cernohous | Feb. 25, 1941 |
| 2,726,067 | Wetherbee | Dec. 6, 1955 |